United States Patent [19]
Couix

[11] 3,917,337
[45] Nov. 4, 1975

[54] FOLDING TENT TRAILER
[76] Inventor: Albert Couix, 4, rue Labatie, 07300 Tournon, France
[22] Filed: Feb. 8, 1973
[21] Appl. No.: 330,738

[30] Foreign Application Priority Data
  Sept. 5, 1972  France .................................. 72.32060

[52] U.S. Cl. ................. 296/23 A; 135/1 A; 135/4 A
[51] Int. Cl.² ............................................. B60P 3/34
[58] Field of Search...... 296/23 A, 23 H, 23 R, 108, 296/109, 114, 118, 122, 111, 23 E, 23 F; 135/4 R, 4 A, 1 A, 1 R; 160/132

[56] References Cited
UNITED STATES PATENTS

| | | | |
|---|---|---|---|
| 522,476 | 7/1894 | Mayer | 296/111 |
| 979,839 | 12/1910 | Geiger | 296/111 |
| 3,489,452 | 1/1970 | Plante | 296/23 R |
| 3,753,590 | 8/1973 | Couix | 296/23 R |

FOREIGN PATENTS OR APPLICATIONS

| | | | |
|---|---|---|---|
| 447,829 | 1/1913 | France | 296/114 |
| 1,936,295 | 2/1970 | Germany | 296/23 F |

Primary Examiner—Frank E. Werner
Assistant Examiner—Gary Auton
Attorney, Agent, or Firm—Raymond A. Robic; Leo A. Rosetta; Arthur Schwartz

[57] ABSTRACT

A folding tent trailer or caravan has one of the frame members supporting the tent connected to the free end of a lever which forms part of a device articulated like a deformable parallelogram further comprising two connecting rods pivoted to the trailer box and coupled by the lever, so that the frame member is elongated in the unfolded position to stretch the tent and is shortened in the folded position to fit it within the box.

5 Claims, 16 Drawing Figures

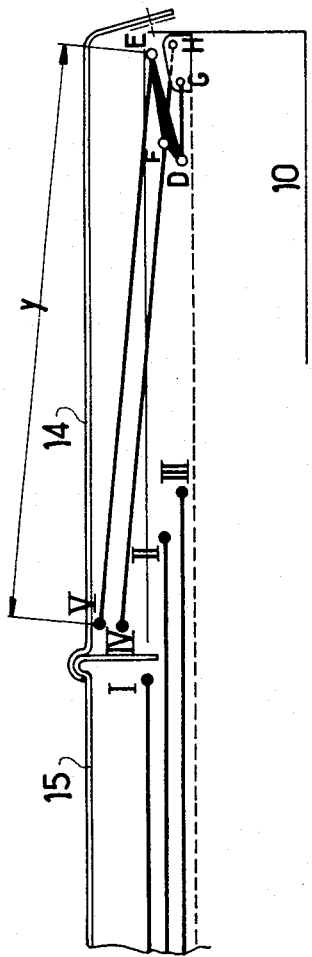
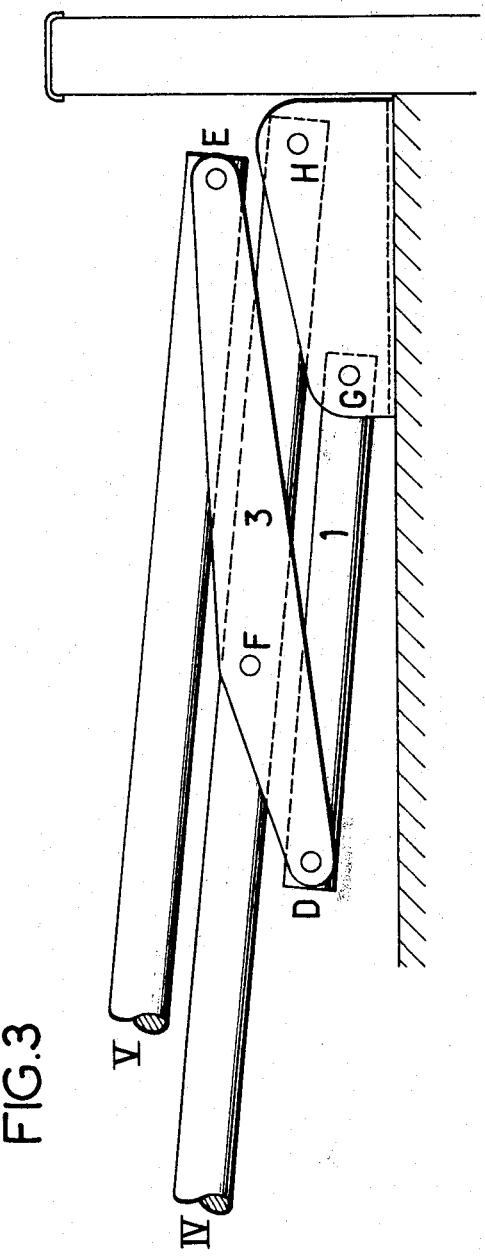
FIG. 2
FIG. 3

PL. IV-10

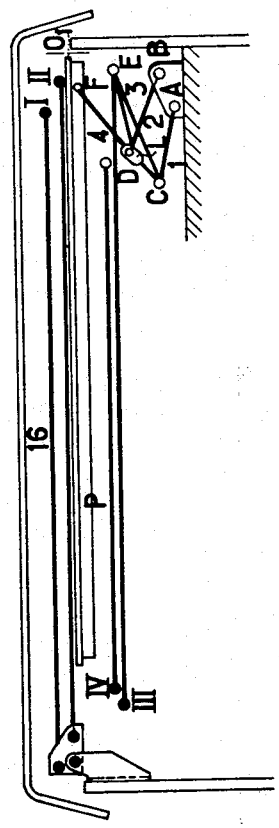
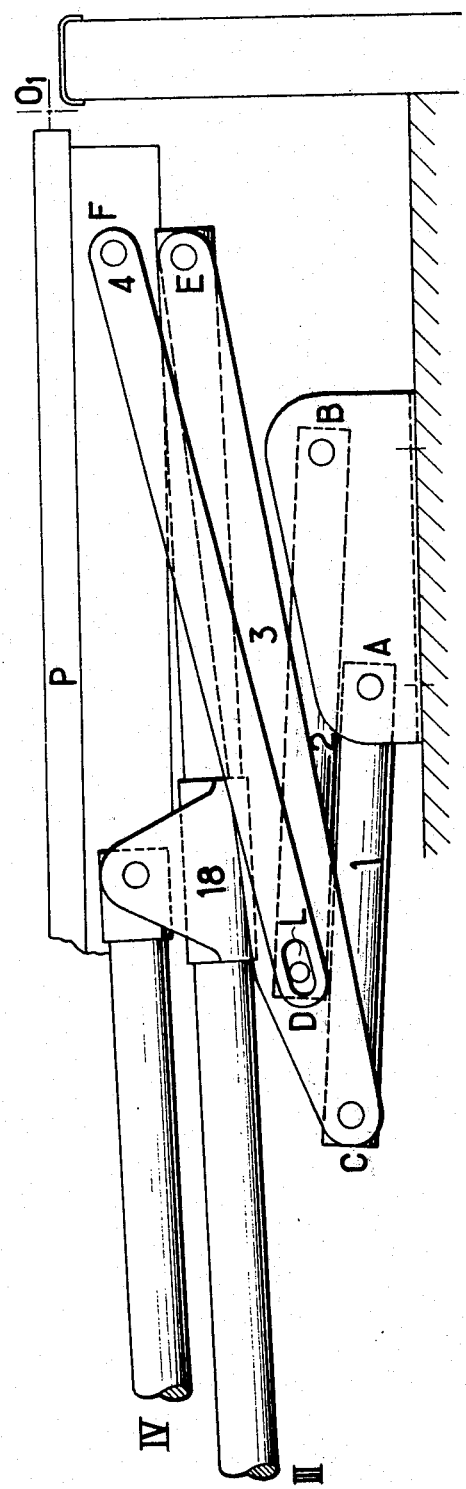
FIG.9
FIG.10

PL.VIII-10

PL.X-10

PL. IX-10

FOLDING TENT TRAILER

The present invention relates to folding tent trailers or caravans of the kind comprising on a chassis equipped with wheels, a box closed by one or two lids and containing a folded tent adapted to be unfolded above the opened box.

This invention is an improvement of this applicant's U.S. Pat. No. 3,753,590, dated Aug. 21, 1973.

The above-mentioned patent describes trailers of the above mentioned type, wherein the tent frame to which the tent is fastened, is articulated on the case and is operated by the opening or closing of the two lids, by means of a rope arrangement.

It is an object of the present invention to simplify the above arrangement and avoid the use of ropes. The invention accordingly provides a device articulated like a deformable parallelogram, comprising two connecting-rods pivoted to the box and coupled by a lever, whose free end is pivoted to one of the frame members supporting the tent in such a way that the frame member is elongated in the unfolded position to stretch the tent, and is shortened in the folded position, to fit it under one of the lids or the plate of the trailer.

The details of this device will be shown in the following description with reference to the enclosed drawings, in which:

FIG. 2 is a fragmentary elevation of the frame in folded position.

FIG. 3 is a detail corresponding to FIG. 2.

FIG. 9 is a fragmentary elevation of the frame in folded position.

FIG. 10 is a detail elevation corresponding to FIG. 9.

Figure 1:
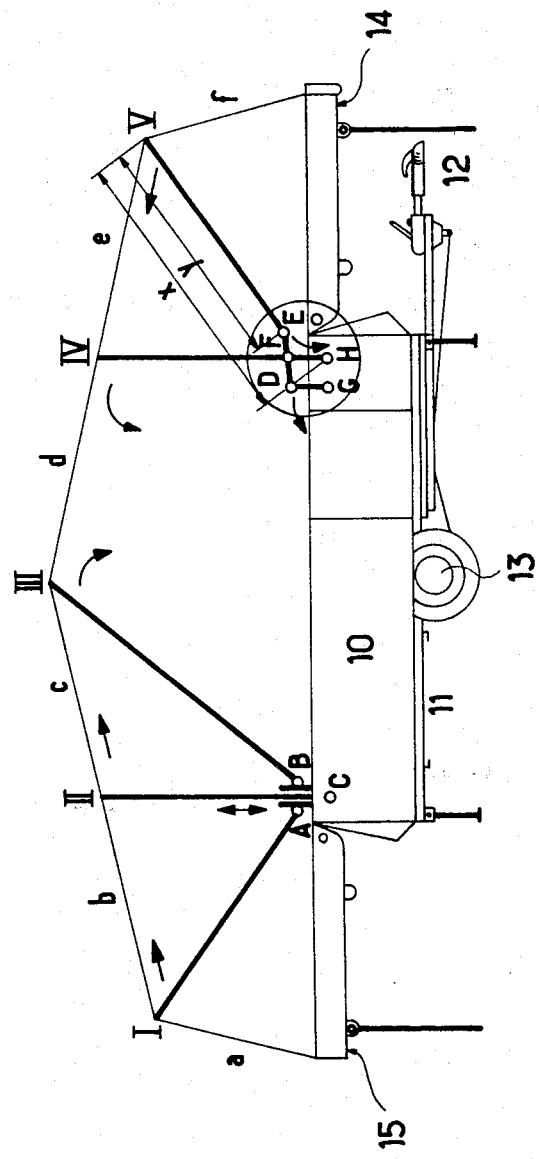
FIG. 1 is a diagrammatic side elevation of a folding trailer whose frame unfolds in the longitudinal direction of the case.

The trailer represented in FIG. 1 comprises in known manner a box 10 secured on a chassis 11 equipped with a towing arm 12 and wheels 13. On box 10 are hinged two lids 14 and 15 which open in the longitudinal direction of box 10. In the closed position (FIG. 2) the lid 14, which opens first, covers the edge of the lid 15 across the centre of box 10.

An articulated frame supports the tent of the trailer and comprises five arch members designated by references I-II-III-IV-V. To one side of the box 10, near the lid 15, are articulated the arch members I-II-III, member II being pivoted at C on the box 10 and members I and III being pivoted at A and B on straps slidably mounted on the posts of the arch-member II. These arch-members are tied together by panels a, b and c of a tent which cause them to unfold when opening the lid 15.

On the other side of the box 10, near the lid 14, are mounted the arch-members IV and V. Arch-member IV is pivoted at H on the box and arch-member V is pivoted at E on the free end of a lever 3 pivoted to the arch-member IV at F and pivoted at D to a connecting-rod 1 parallel to arch-member IV, the connecting-rod 1 being pivoted at G to the box 10. Arch-members IV and V are joined by panels e and f of the tent which cause them to unfold when opening the lid 14.

Figure 4:
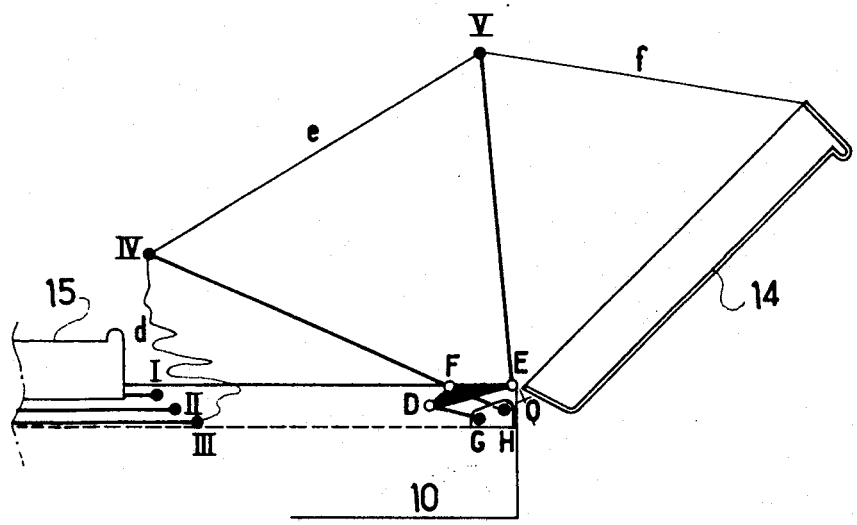
FIG. 4 is a diagrammatic elevation of the trailer in partly open position.
Figure 5:
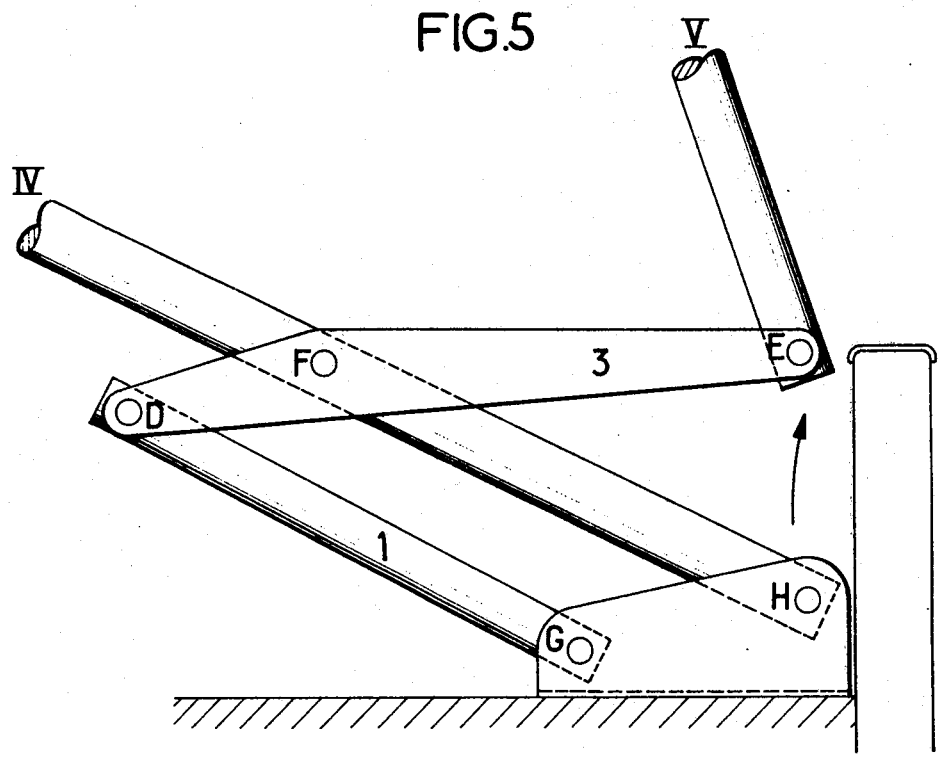
FIG. 5 is a detail elevation on an enlarged scale corresponding to FIG. 4.

When opening takes place, the lid 14 revolves around the point 0 (FIG. 4). This rotation stretches the tent panel f, then raises the inclined arch-member V which swivels around E. When the cloth panel e tightens, the arch-member IV is then raised in its turn and it pivots around H. At this moment, the lever 3 (FIG. 5) is raised by the arch-member IV (FIG. 4) and is guided by the connecting-rod 1 (FIG. 5) causing pivot point E to follow an ascending curve necessary to position the arch-member V in its final position wherein it stretches the tent.

Figure 6:
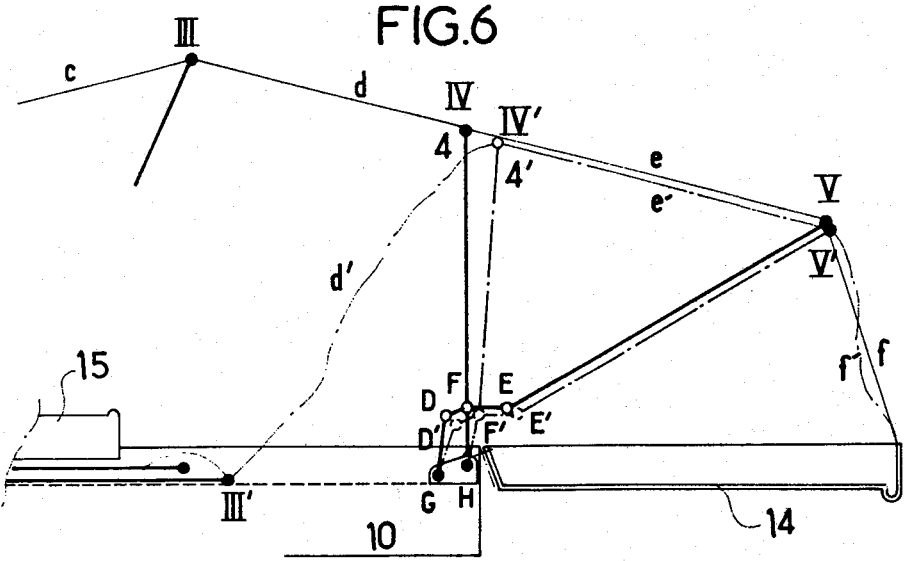
FIG. 6 is a diagrammatic elevation showing the end of the opening movement of the first lid.
Figure 7:
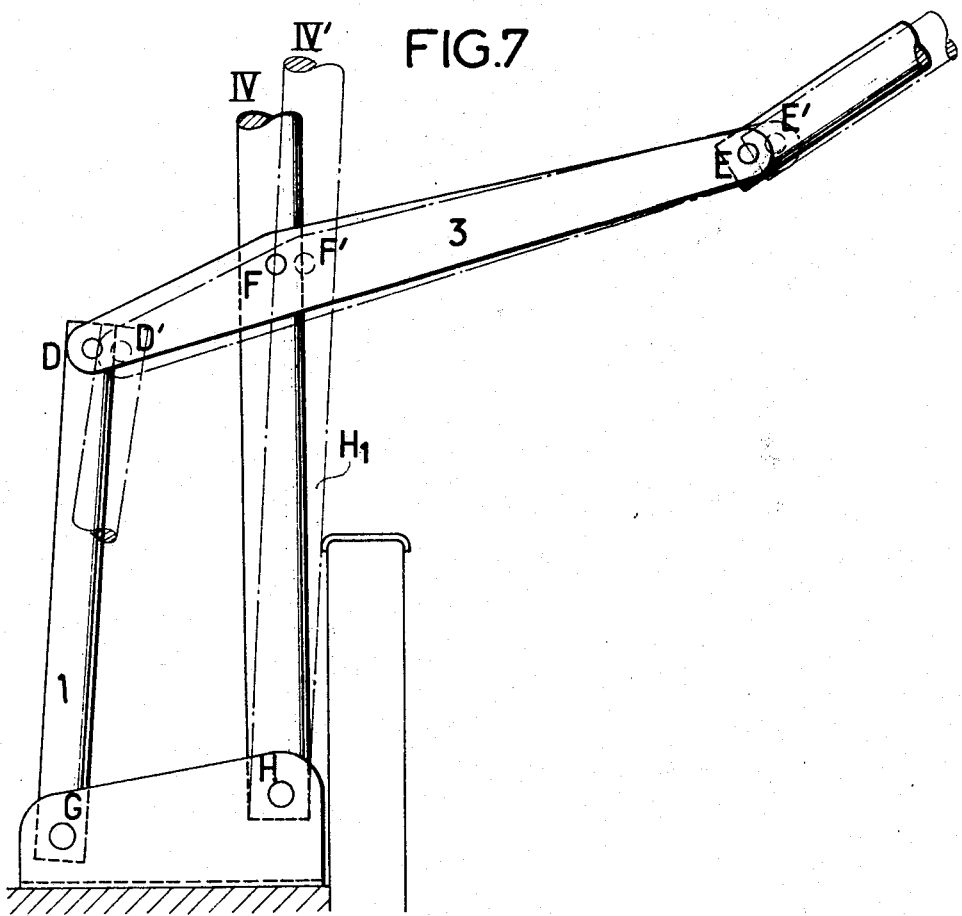
FIG. 7 is a detail elevation on an enlarged scale corresponding to FIG. 6.

Near the end of this movement (FIG. 6) the arch-member IV goes past a vertical position and is pushed by its own weight as well as that of the inclined arch-member V. Arch-member IV and V are limited in their travel by arch-member IV abutting and leaning at $H_1$ against the box 10 (FIG. 7). The positions IV' and V' represent the limit-positions of the arch-members IV and V (FIGS. 6 and 7), while awaiting the opening of the second lid 15.

When opening the second lid 15, the tent stretches (FIG. 1) and takes its position as soon as the arch-members I, II and III are raised by the cloth. Near the end of this second stage, the cloth panel d tightens (FIG. 6) and the arch-member IV returns from the position IV' to the final position IV. At this moment the cloth-cover is fully unfolded.

This device is thus effective to shorten the arch-member V to a length y (FIG. 2) in the folded position under lid 14, while giving it a greater length x in the unfolded position of use (FIG. 1).

Figure 8:
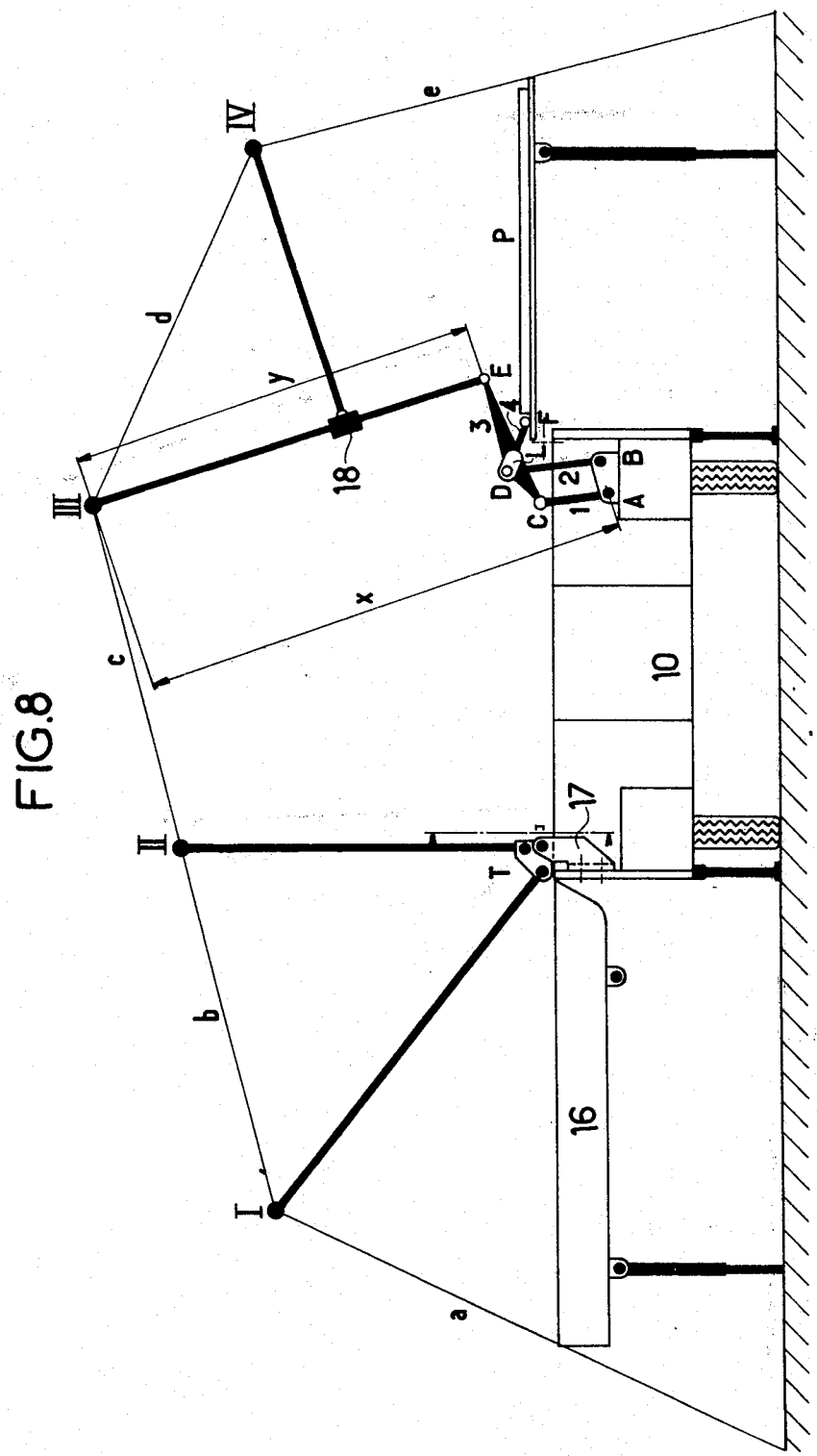
FIG. 8 is a diagrammatic end elevation of a modified embodiment which unfolds in transverse direction.

The trailer represented in FIG. 8 comprises a frame which unfolds transversely to the box 10, which is equipped with a lid 16, hinged to one of the longitudinal sides of the box. On the other side of box 10, a plate P covered by lid 16 in closed position (FIG 9), is hinged $0_1$.

The articulated frame supporting the tent of this trailer comprises four arch-members I-II-III-IV. On one side of the box 10, near the lid 16, the arch-members I and II are pivoted on a strap T itself pivoted on another strap 17 rigid with the box 10 (FIG. 8). These arch-members are tied together by panels a and b of the cloth, which causes them to unfold when opening the lid 16.

On the other side of the box 10, near the plate P, are mounted the arch-members III and IV. Arch-member III is pivoted at E to the end of a lever 3 joining the extremities C and D of two connecting-rods 1 and 2, which are pivoted at points A and B to the box 10; the arch-member IV is pivoted to straps 18 slidably mounted on the posts of the arch-member III.

The plate P is coupled with the connecting-rod 2 by means of a small connecting-rod 4 pivoted at F to plate P and at D to the connecting-rod 2 by means of a slot L.

The arch-members III and IV are tied together by the panels d and e of the cloth which causes them to unfold when opening the plate P. The panel c of the cloth ties the arch-members II and III.

Figure 11:
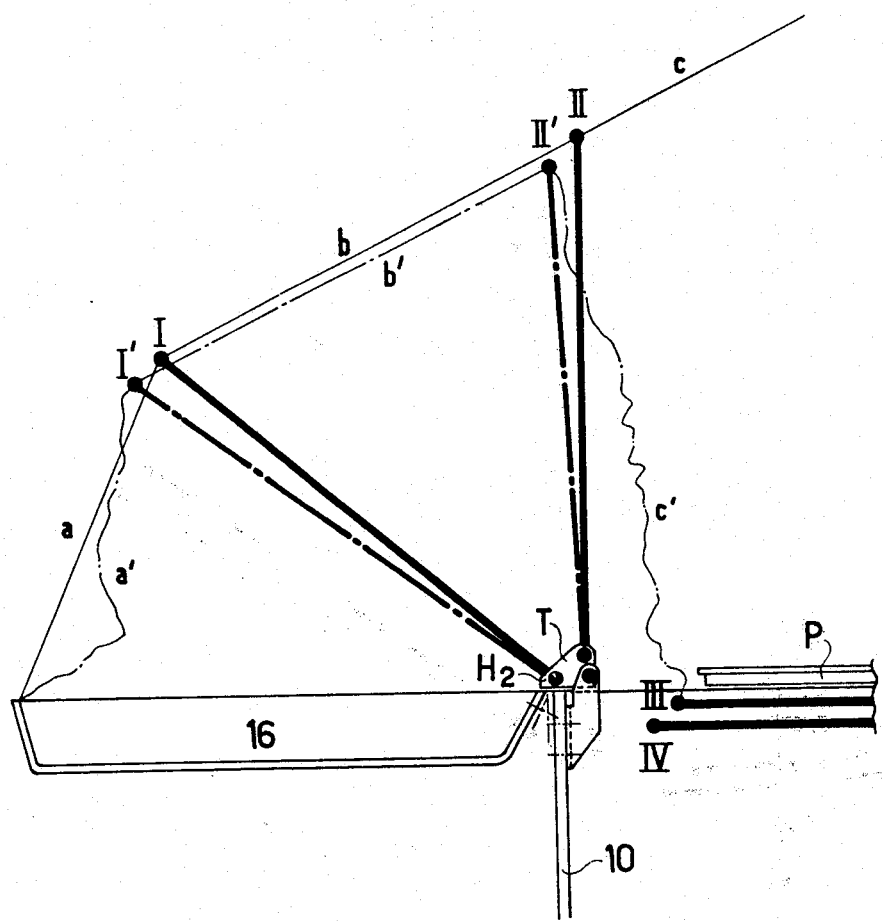
FIG. 11 is a diagrammatic elevation with a lid open.

The first stage in the unfolding operation consists of opening lid 16. (FIG. 11). After the unfolding of the cloth, the arch-member II impinges on box 10 through the intermediary of strap T, taking the position II' and supporting the arch-holder I at I' through the tension of the cloth in the position indicated at b'.

Figure 12:
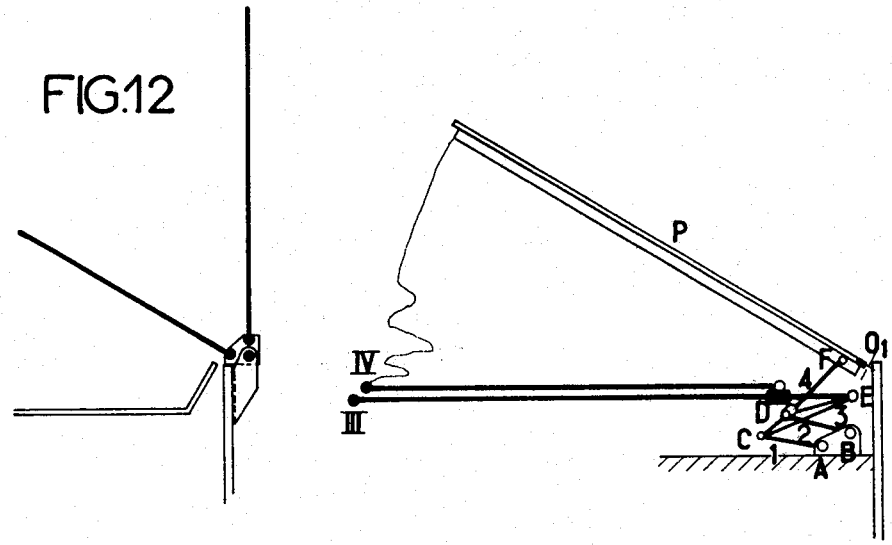
FIG. 12 is a diagrammatic elevation with a plate partly open.
Figure 13:
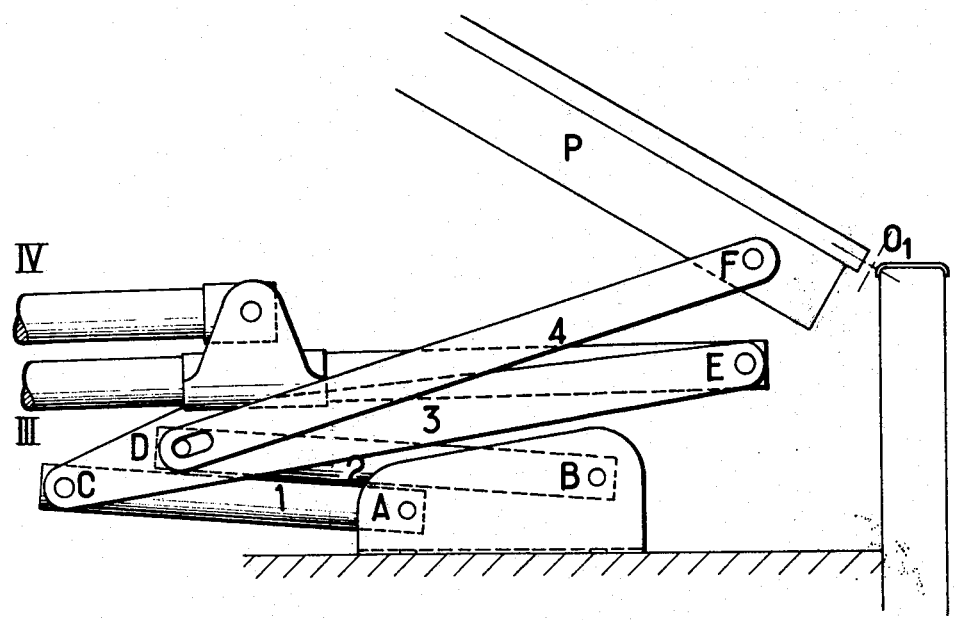
FIG. 13 is a detail elevation on an enlarged scale corresponding to FIG. 12.

In the second opening stage, plate P is rotated around $0_1$. During a first period the plate P pivots and due to the slot L of the small connecting-rod 4, only begins to unfold the whole mechanism, after having moved through a certain angle (FIGS. 12 and 13).

Figure 16:
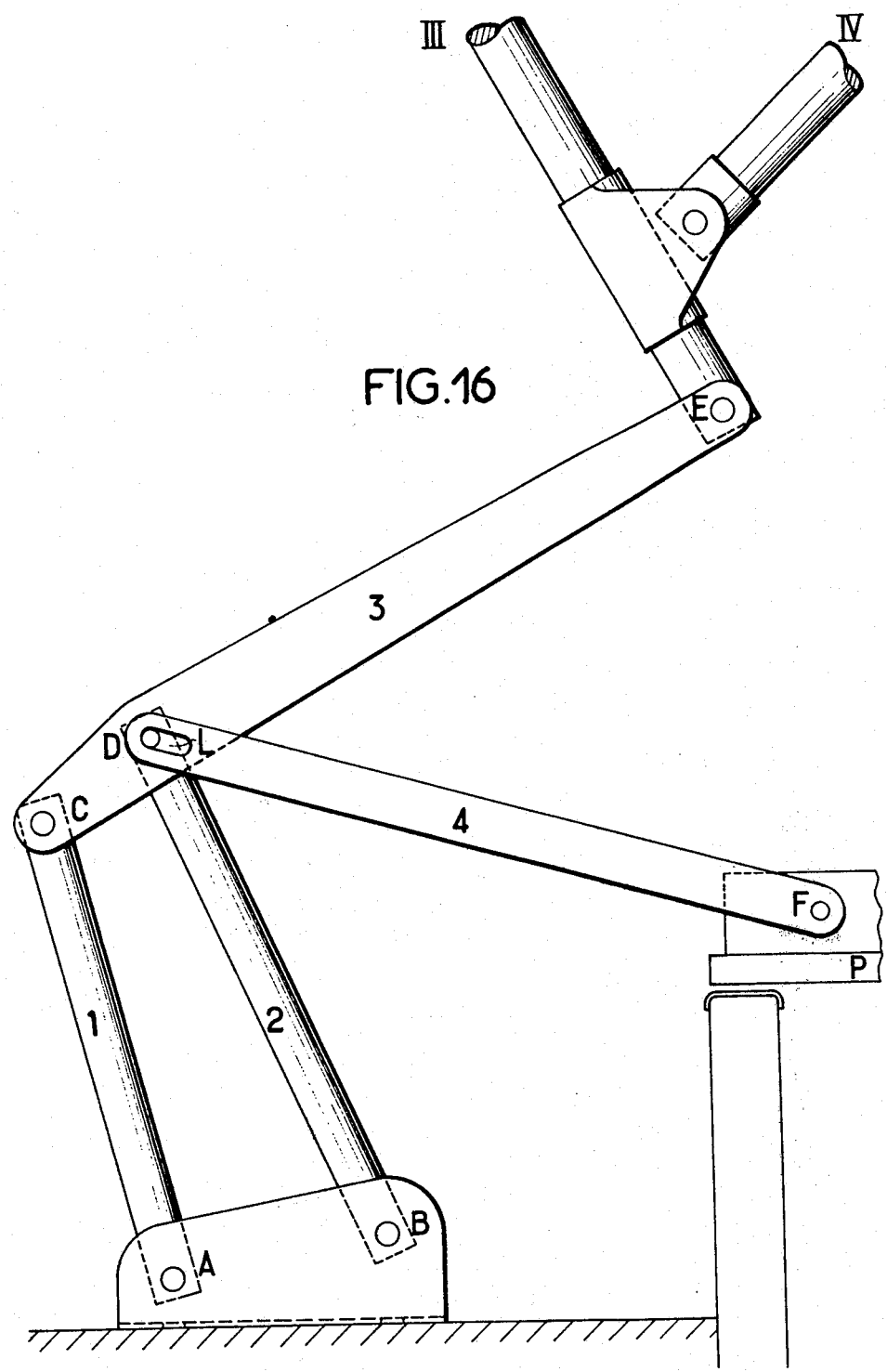
FIG. 16 is a detail elevation with the plate fully open.
Figure 14:
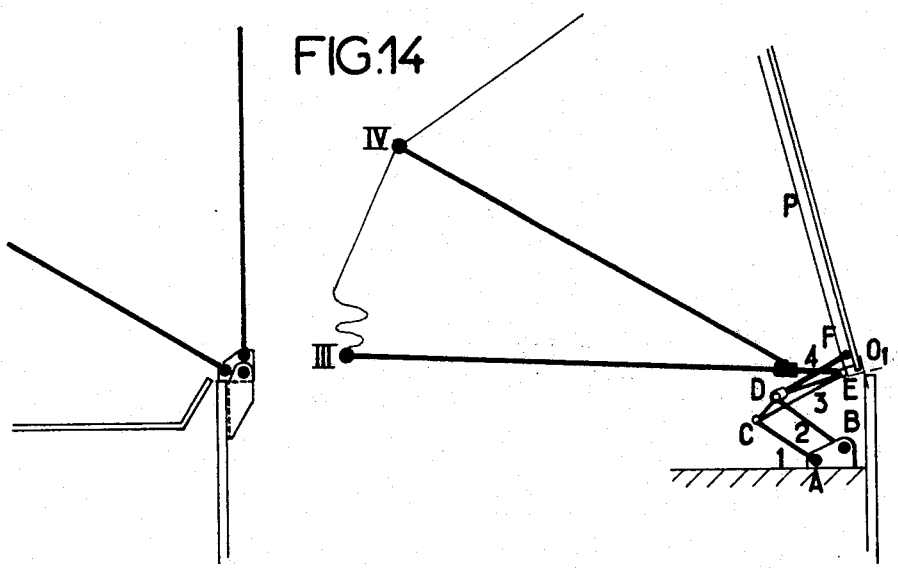
FIG. 14 is a diagrammatic elevation with the plate open further.
Figure 15:
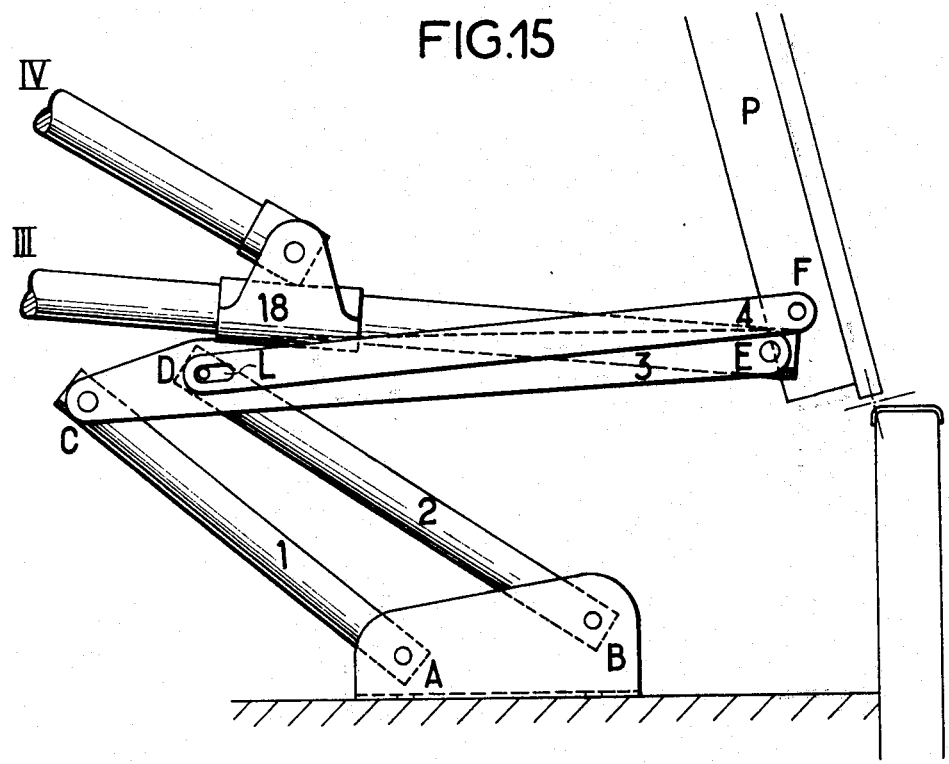
FIG. 15 is a detail elevation on an enlarged scale corresponding to FIG. 14.

The small connecting-rod 4 pulled by the plate P (FIGS. 14 and 15) pulls in its turn on the connecting-rod 2 and rotates the same around B. At this moment the lever 3 pulled by the connecting-rod 2 and guided by the connecting-rod 1 causes point E to follow an ascending curve necessary to position the arch-members III and IV. (FIGS. 8 and 16).

At the end of the opening movement, panel c of the cloth tightens and brings the arch-member back from position II' to position II (FIG. 11).

It is obvious that in both embodiments all the described and represented pivots, levers and connecting-rods are duplicated, each post of each arch-member being equipped with one.

I claim:

1. In a folding tent trailer having a box provided with at least one hinged cover member and containing a tent and a plurality of arch members pivotally supported by said box to swing upwardly therefrom and having tent engaging portions to hold said tent in erected condition, the improvement comprising:
   a pair of links which are generally parallel in all positions thereof pivoted to the sides of said box on longitudinally spaced apart axes for upward swinging movement;
   a lever pivoted to each of said links at pivot points fixed on said links and spaced upwardly from said axes, and lever having an end portion thereof extending laterally of one link in a direction away from the other link;
   at least one end of one of said arch members being pivoted to said end portion of said lever; and
   means connected to said cover and responsive to swinging movement thereof to swing said links about their axes and thereby project said at least one arch member upwardly to tighten said tent.

2. A trailer as defined in claim 1 wherein one of said links comprises a lower leg portion of another of said arch members, said means connected to said cover comprising said tent member being secured to the tent engaging portion of said another arch member and to said hinged cover member.

3. A trailer as defined in claim 1 wherein said means connected to said cover comprises a connecting rod pivotally connected to said cover member and to one of said links.

4. A trailer as defined in claim 3 wherein the pivotal connection between said connecting rod is a pin-and-slot connection providing a lost motion therebetween.

5. A trailer as defined in claim 3 including a further arch member slidably movable along said at least one arch member.

* * * * *